(12) United States Patent
Penner et al.

(10) Patent No.: US 8,196,985 B2
(45) Date of Patent: Jun. 12, 2012

(54) CONSOLE ASSEMBLY

(75) Inventors: Benjamin Warren Penner, Ann Arbor, MI (US); Hiroyuki Morita, Prefecture (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 62 days.

(21) Appl. No.: 12/628,412

(22) Filed: Dec. 1, 2009

(65) Prior Publication Data

US 2011/0127791 A1    Jun. 2, 2011

(51) Int. Cl.
    *B60R 13/00*    (2006.01)
(52) U.S. Cl. .................................................. 296/24.34
(58) Field of Classification Search ............... 296/24.34, 296/214, 24.46, 37.14, 37.8, 37.7; 224/275, 224/926; 248/311.2
    See application file for complete search history.

(56) References Cited

U.S. PATENT DOCUMENTS

| | | | | |
|---|---|---|---|---|
| 4,685,729 | A | * | 8/1987 | Heesch et al. ............ 297/188.09 |
| 4,733,900 | A | * | 3/1988 | Fluharty ....................... 296/37.8 |
| 4,809,897 | A | * | 3/1989 | Wright, Jr. ..................... 224/282 |
| 4,986,674 | A | | 1/1991 | Decker et al. |
| 5,018,633 | A | * | 5/1991 | Toth et al. ................... 248/311.2 |
| 5,338,081 | A | * | 8/1994 | Young et al. ................ 296/37.14 |
| 5,397,160 | A | * | 3/1995 | Landry ......................... 296/37.8 |
| 5,551,616 | A | * | 9/1996 | Stitt et al. ....................... 224/275 |
| 5,680,974 | A | * | 10/1997 | Vander Sluis ................. 224/281 |
| 5,845,965 | A | * | 12/1998 | Heath et al. ............. 297/188.19 |
| 6,045,173 | A | * | 4/2000 | Tiesler et al. ................ 296/37.8 |
| 6,135,529 | A | | 10/2000 | De Angelis et al. |
| 6,250,729 | B1 | | 6/2001 | Allison et al. |
| 6,338,429 | B1 | * | 1/2002 | Pesce .............................. 224/539 |
| 6,419,314 | B1 | * | 7/2002 | Scheerhorn .............. 297/188.19 |
| 6,422,440 | B1 | * | 7/2002 | Stone ............................. 224/275 |
| 6,435,587 | B1 | | 8/2002 | Flowerday et al. |
| 6,497,443 | B2 | * | 12/2002 | Worrell et al. ................ 296/37.8 |
| 6,619,738 | B1 | | 9/2003 | Filipovich |
| 6,663,155 | B1 | | 12/2003 | Malone et al. |
| 6,719,343 | B2 | * | 4/2004 | Emerling et al. .......... 296/24.34 |
| 6,719,367 | B2 | * | 4/2004 | Mic et al. .................. 297/188.19 |
| 6,726,267 | B2 | | 4/2004 | Kim et al. |
| 6,761,388 | B2 | * | 7/2004 | Lein et al. ................... 296/24.34 |
| 6,851,736 | B1 | * | 2/2005 | Klopp et al. ................... 296/37.8 |
| 6,918,257 | B2 | * | 7/2005 | Slone et al. ..................... 62/3.61 |
| 6,921,118 | B2 | | 7/2005 | Clark et al. |
| 7,029,048 | B1 | * | 4/2006 | Hicks et al. ................. 296/24.34 |
| 7,066,436 | B2 | * | 6/2006 | Honda et al. ............... 248/311.2 |
| 7,111,883 | B1 | * | 9/2006 | Patel et al. .................. 296/24.34 |
| 7,114,755 | B1 | * | 10/2006 | Sturt et al. .................. 296/24.34 |
| 7,140,660 | B2 | * | 11/2006 | Oana ............................. 296/37.8 |

(Continued)

*Primary Examiner* — Kiran B Patel
(74) *Attorney, Agent, or Firm* — Gifford, Krass, Sprinkle, Anderson & Citkowski, P.C.

(57) ABSTRACT

A console assembly for use in an automotive vehicle is provided. The console assembly includes a housing having first end wall, a pair of side walls spaced apart from each other, and an open end spaced apart from the first end wall. Each of the pair of side walls has a free end. The free end extends from the first end wall so as to define a first storage compartment. Each of the pair of side walls also includes a slot extending longitudinally from the free end towards the first end wall. The console assembly further includes a storage box slidably engaged within the housing. The storage box has a second end wall and a pair of arms spaced apart from each other. Each of the pair of arms is configured to engage respective slots of the housing. The storage box is operable to move between a first position and a second position.

14 Claims, 6 Drawing Sheets

U.S. PATENT DOCUMENTS

| | | | |
|---|---|---|---|
| 7,185,937 B2 * | 3/2007 | Sakakibara | 296/37.8 |
| 7,278,681 B2 * | 10/2007 | Lilov et al. | 297/188.17 |
| 7,370,898 B2 * | 5/2008 | Sturt et al. | 296/24.34 |
| 7,401,831 B2 * | 7/2008 | Sturt | 296/37.8 |
| 7,416,235 B2 * | 8/2008 | Rajappa et al. | 296/37.8 |
| 7,434,859 B2 * | 10/2008 | Mulvihill | 296/24.34 |
| 7,481,475 B1 * | 1/2009 | Lim et al. | 296/24.34 |
| 7,513,553 B2 * | 4/2009 | Singh et al. | 296/37.8 |
| 7,530,615 B2 * | 5/2009 | Ogura | 296/24.34 |
| 7,533,918 B2 * | 5/2009 | Spykerman et al. | 296/24.34 |
| 7,537,287 B2 * | 5/2009 | Wieczorek et al. | 297/411.35 |
| 7,543,874 B2 * | 6/2009 | Ogura et al. | 296/37.8 |
| 7,568,601 B2 * | 8/2009 | Kogami et al. | 224/483 |
| 7,708,328 B2 * | 5/2010 | Doom et al. | 296/37.12 |
| 7,708,436 B2 * | 5/2010 | Lota | 362/488 |
| 7,802,833 B2 * | 9/2010 | Boreanaz et al. | 296/24.34 |
| 7,866,722 B2 * | 1/2011 | Shibata et al. | 296/24.34 |
| 7,889,860 B2 * | 2/2011 | Tinoco | 379/455 |
| 2005/0035618 A1 * | 2/2005 | Toth et al. | 296/24.34 |
| 2006/0113811 A1 * | 6/2006 | Tanaka et al. | 296/24.34 |
| 2007/0069541 A1 * | 3/2007 | Sturt et al. | 296/24.34 |
| 2007/0075107 A1 | 4/2007 | Brancheriau et al. | |
| 2007/0075558 A1 * | 4/2007 | Kim et al. | 296/24.34 |
| 2008/0007079 A1 * | 1/2008 | Sturt et al. | 296/24.34 |
| 2008/0303302 A1 * | 12/2008 | Sturt et al. | 296/37.8 |
| 2009/0058120 A1 * | 3/2009 | Ioka et al. | 296/24.34 |
| 2010/0078954 A1 * | 4/2010 | Liu et al. | 296/24.34 |
| 2010/0090491 A1 * | 4/2010 | Hipshier et al. | 296/24.34 |
| 2010/0201147 A1 * | 8/2010 | Jones et al. | 296/24.34 |
| 2010/0314896 A1 * | 12/2010 | Skibinski et al. | 296/24.34 |
| 2011/0037287 A1 * | 2/2011 | Penner | 296/37.8 |
| 2011/0042972 A1 * | 2/2011 | Penner | 292/336.3 |
| 2011/0068598 A1 * | 3/2011 | Penner | 296/37.8 |
| 2011/0095555 A1 * | 4/2011 | Penner | 296/24.34 |

* cited by examiner

CONSOLE ASSEMBLY

FIELD OF THE INVENTION

The invention relates to a console assembly for use in an automotive vehicle. More particularly, the invention relates to a console assembly operable to create a reconfigurable storage compartment. The console assembly includes a storage box operable to move between a first position and a second position so as to form a second storage compartment.

BACKGROUND OF THE INVENTION

Console assemblies include a housing for storing articles. Some console assemblies also include a storage box which may be pulled out of the housing. For instance, one such console assembly includes a first housing having a pair of upright side walls, a closed end, an open end, and an inner storage box slidable disposed between the upright side walls. The inner storage box is operable to slide out of the housing through the open end. The inner storage box has a pair of closed ends. Accordingly, such console assemblies are not able to hold goods in the storage box as well as the console assembly housing without having to remove goods from the console housing assembly prior to sliding the storage box within the housing.

Many console assemblies are injection molded from material such as thermoplastic. The side walls include an inner panel and an outer panel, and a plurality of ribs interconnecting the inner panel to the outer panel to provide structural support for the side walls. The storage capacity of the housing is diminished as the inner storage box is disposed between respective inner panels of the housing. Thus it is desirable to have a console assembly wherein the storage capacity is not compromised by a an inner storage box and wherein the housing assembly and the inner storage box may be simultaneously used without having to remove articles from the housing assembly prior to positioning the storage box within the housing assembly.

SUMMARY OF THE INVENTION

According to one aspect of the invention, a console assembly for use in an automotive vehicle is provided. The console assembly includes a housing having a closed end (referenced herein as a "first end wall"), a pair of side walls spaced apart from each other, and an open end spaced apart from the first end wall. Each of the pair of side walls has a free end. The free ends extend from the first end wall so as to define a first storage compartment. The first storage compartment encloses a finite space. Each of the pair of side walls also includes a slot extending longitudinally from the free end towards the first end wall.

The console assembly further includes a storage box slidably engaged within the housing. The storage box is operable to move between a first position and a second position. The storage box has a second end wall and a pair of arms spaced apart from each other. Each of the pair of arms extend from the second end wall and each arm is configured to engage respective slots of the housing. Accordingly, the user may place articles in the first storage compartment as well as in the second storage compartment without having to remove the articles from the first storage compartment prior to positioning the storage box within the slots of respective side walls of the housing.

According to a second preferred embodiment of the invention, a console assembly for use in an automotive vehicle includes a housing having a first end wall and a pair of side walls spaced apart from each other. Each of the side walls has a free end extending from the first end wall so as to define a storage compartment. Each of the side walls further includes a slot extending longitudinally from the free end of respective side walls towards the first end wall. The console assembly further includes a partition. The partition is disposed opposite the first end wall and extends between the free ends of each side wall. A storage box is slidably engaged within the housing between a first position and a second position. The storage box includes a second end wall and a pair of arms spaced apart from each other. Each of the pair of arms is configured to engage respective slots of the housing.

As in the first preferred embodiment, in the first position each of the pair of arms are disposed substantially within respective slots of the side walls. Accordingly the storage space of the first housing is not compromised by the placement of the storage box. Furthermore, the console assembly the second storage compartment is segregated from the first storage compartment by the partition. Similar to the console assembly of the first preferred embodiment, articles within the first storage compartment will not affect the operation of the storage box.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
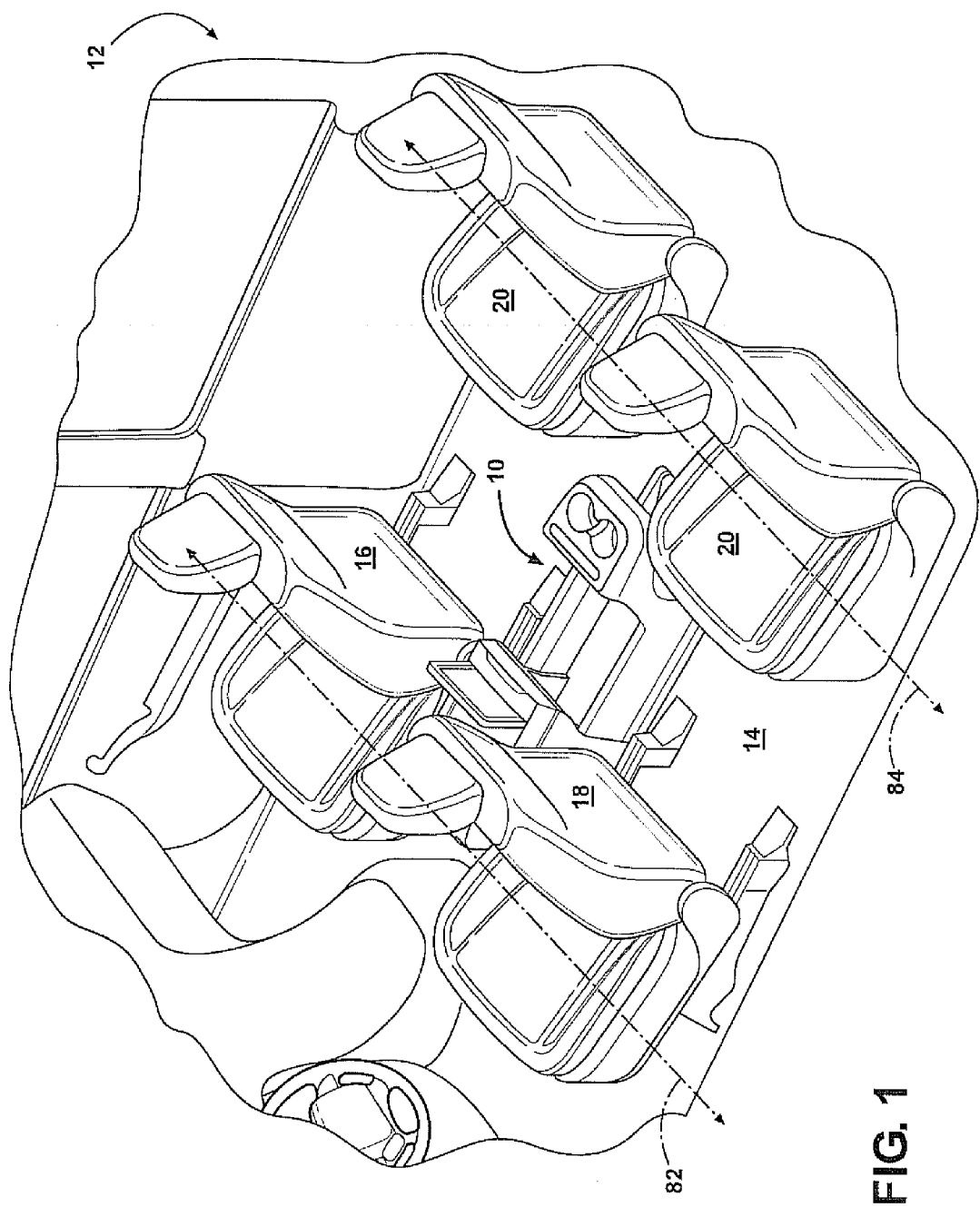
FIG. 1 is a perspective view of a first preferred embodiment of the console assembly disposed within the interior of an automotive vehicle.

With reference now to FIGS. 1-5, a first preferred embodiment of a console assembly 10 for use in an automotive vehicle 12 is shown mounted to the floor 14 of the automotive vehicle 12. The console assembly 10 is disposed between the front passenger seat 16 and the driver seat 18, and generally forward of the rear passenger seats 20. The console assembly 10 includes a housing 22 having a first end wall 24, a pair of side walls 26 spaced apart from each other, and an open end 28 opposite the first end wall 24. The housing 22 may be formed from thermoplastic material or any other material suitable for molding processes such as injection molding. Each of the pair of side walls 26 extends from the first end wall 24 to a free end 30 and extend generally upright with respect to the floor 14 of the vehicle 12 so as to define a first storage compartment 32. The open end 28 is disposed between respective free ends 30 of each side wall 26. The first storage compartment 32 encloses a predetermined space. Each of the pair of side walls 26 further includes a slot 34. The slot 34 extends longitudinally from the free end 30 of respective side walls 26 towards the first end wall 24.

The console assembly 10 further includes a storage box 36 slidably engaged within the housing 22. More specifically, the storage box 36 is slidably engaged with respective slots 34 of each side wall 26. The storage box 36 may be formed of the same material as the housing 22. The storage box 36 is movable between a first position and a second position. The storage box 36 has a second end wall 38 and a pair of arms 40 spaced apart from each other. The pair of arms 40 extends from the second end wall 38, and each of the pair of arms 40 is configured to engage respective slots 34 of the housing 22. In the first position the second end wall 38 is generally flushed and engaged with the free ends 30 of respective pair of side walls 26, and the arms 40 are housed within the slot 34 of respective side walls 26. In the second position the second end wall 38 is displaced from the free ends 30 of the side walls 26 so as to form a second storage compartment 33.

Figure 5:
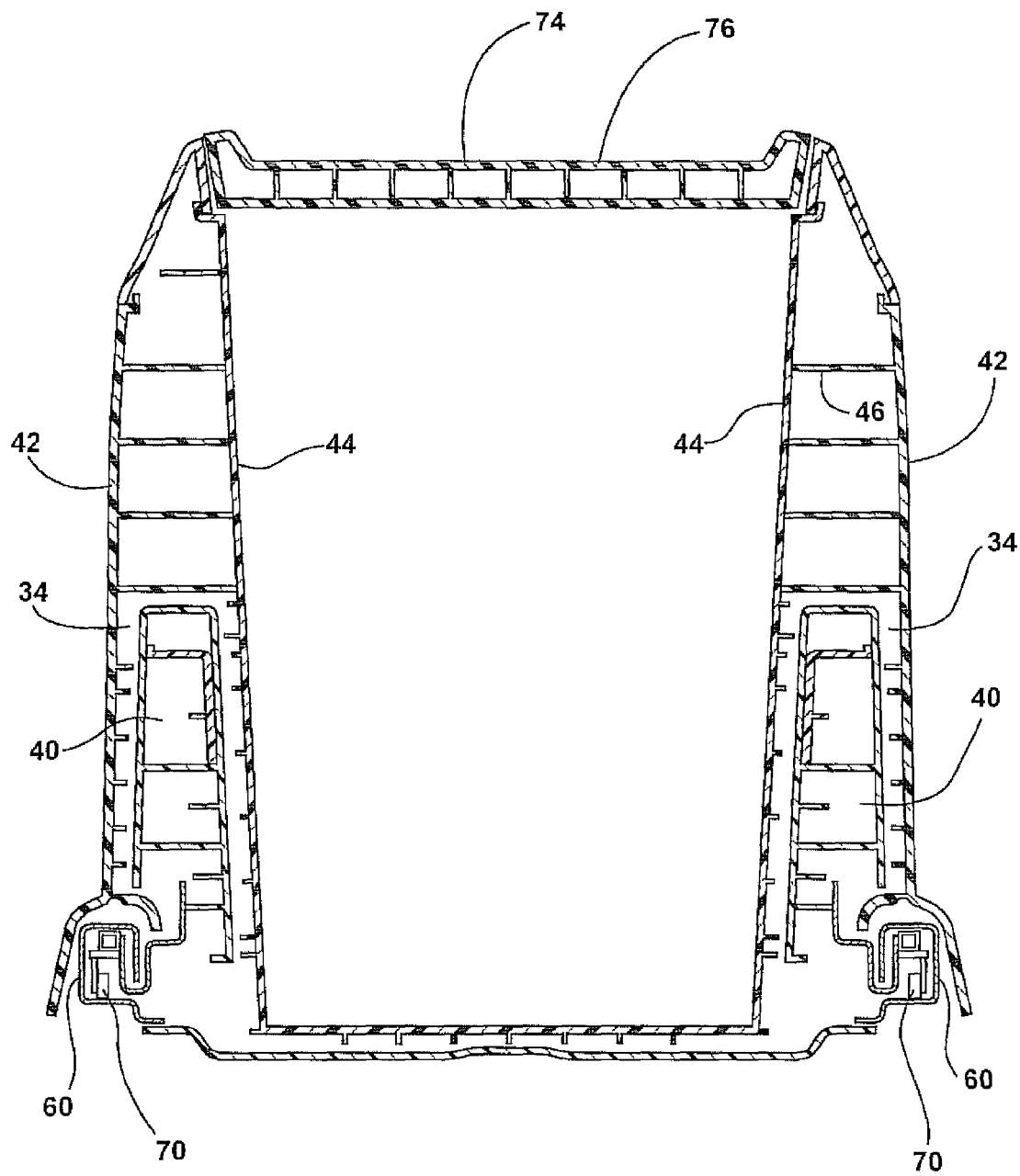
FIG. 5 is a cross-sectional view of FIG. 2 taken along lines 5-5.

With reference now to FIG. 5, the side walls 26 may be injection molded and formed as one piece. Alternatively, the side walls 26 may be formed by different parts. For instance, the side wall 26 may be formed by an outer surface panel 42 and an inner surface panel 44, and the slot 34 is disposed between the inner and outer surface panels 44, 42. The outer surface panel 42 and the inner surface panel 44 may further include ribs 46. The ribs 46 are disposed between the outer surface panel 42 and the inner surface panel 44 so as to provide structural reinforcement to the housing 22. More specifically, the ribs 46 interconnect and strengthen the side walls 26 when the outer surface panel 42 and inner surface panel 44 are attached together. The ribs 46 may be formed during the injection molding process so as to interconnect the pair of side walls 26. The ribs 46 extend longitudinally along the side wall 26 from the free end 30 towards the first end wall 24. Some of the ribs 46 may be disposed above the slot 34, while the remaining ribs 46 are disposed beneath the slot 34. Accordingly, a portion of the inner panel remains spaced apart and opposite a corresponding portion of the outer panel so as to form the slot 34.

The outer surface panel 42 and inner surface panel 44 may further be injection molded to include attachment portions such as a tab (not shown) and a corresponding female member (not shown). Assembly of the side wall 26 may be done by simply attaching the outer surface panel 42 to the inner surface panel 44 by having the tab engage a corresponding female member. In another embodiment, the edges of the inner surface panel 44 and outer surface panel 42 are attached together using known techniques such as vibrational welding, as shown in FIG. 5. To facilitate the injection molding process, the side walls 26 may be formed so as to be angled towards each other. Having the side walls 26 angled towards each other allows the tooling to be removed after molding.

The console assembly 10 may further include a tray 52. The tray 52 has a generally planar surface and is configured to support the housing 22 and the storage box 36. The fray 52 may include mounting portions 54 adapted to fix the tray 52 to the floor 14 of the vehicle 12. Preferably the tray 52 is fixed between the front passenger and driver seats 16, 18 of the vehicle 12. The tray 52 may be made of a thermoplastic material or metal. Preferably the tray 52 is stamped out of metal so as to provide support for the housing 22. The tray 52 includes a first portion 56 and a second portion 58. The first portion 56 is adapted to fixedly hold the housing 22 to the vehicle 12 floor 14. The second portion 58 may include a rail 60. The rail 60 extends longitudinally along the second portion 58 of the tray 52.

Figure 2:
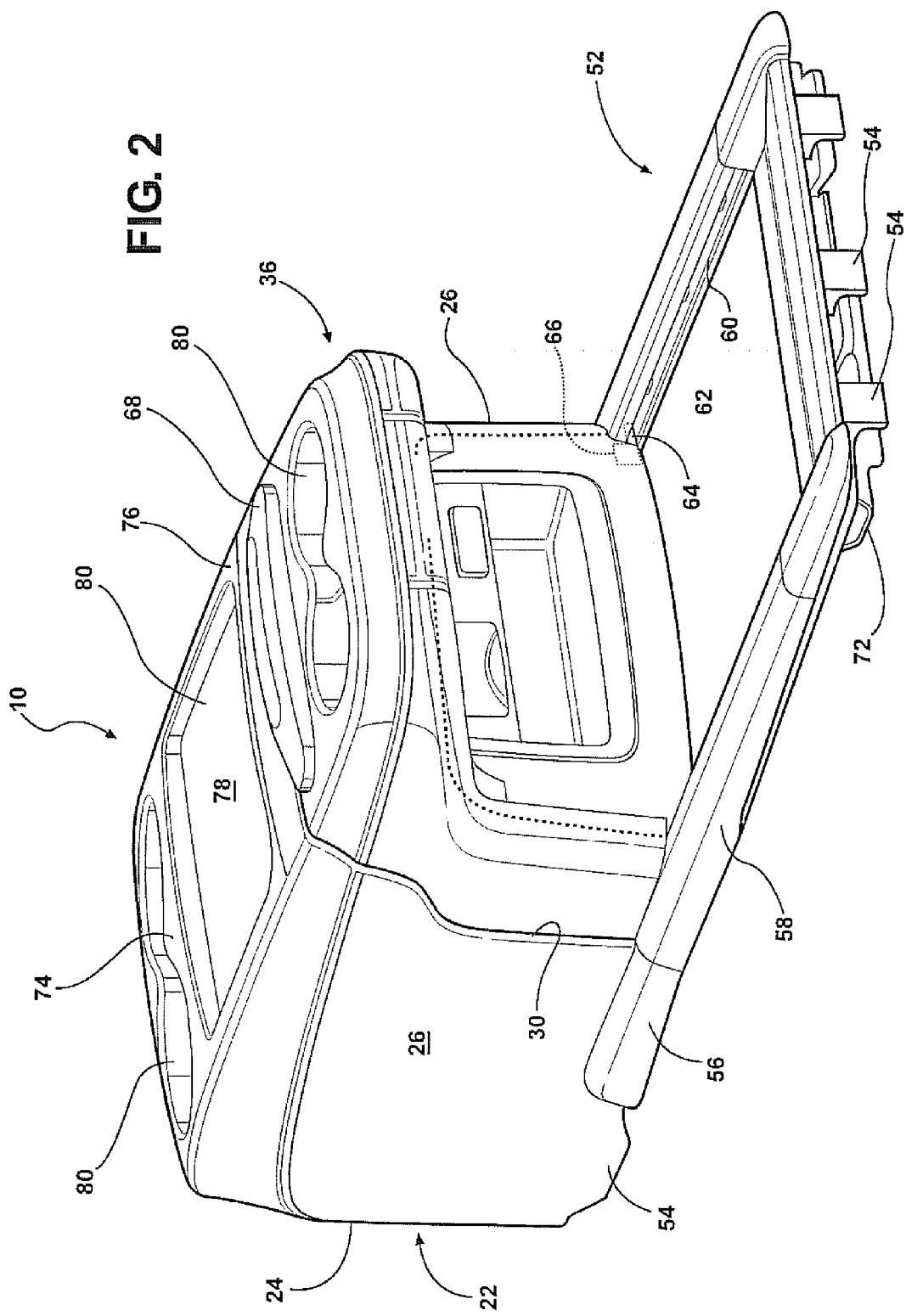
FIG. 2 is a perspective view of console assembly of the first preferred embodiment wherein the storage box is in the first position.

With reference now to FIG. 2, the tray 52 includes a pair of rails 60. Each rail 60 is disposed on opposite sides of the tray 52. Each rail 60 includes a plurality of rail slots 62. Each rail slot 62 is evenly spaced apart from the other. The storage box 36 may further include a catch 64 configured to engage the rail slots 62 so as to selectively position the storage box 36 along a selected portion of the rail 60. More specifically, each catch 64 is configured to engage the rail slots 62 so as to selectively position the storage box 36 along the second portion 58 of the tray 52. Accordingly, the second storage compartment 33 may be reconfigurable in terms of size as the second end wall 38 may be selectively displaced from the free end 30 of the side wall 26.

With reference again to FIG. 2, the catch 64 is disposed adjacent the second end wall 38 and along the base of respective arms 40. A biasing member 66 is operatively connected to the catch 64. The biasing member 66 urges the catch 64 to engage the rail 60. The storage box 36 may further include a handle 68 operatively connected to the catch 64. The handle 68 is operable to actuate the catch 64 so as to overcome the biasing force of the biasing member 66 and disengage the catch 64 from the rail 60. Thus in operation the handle 68 may be actuated so as to disengage the catch 64 from the rail 60 and the storage box 36 may be slid towards the second position and the handle 68 may be released so as to selectively position the storage box 36 along a portion of the second portion 58 of the tray 52.

With reference again to FIG. 5, the storage box 36 may further include a pair of rollers 70. One roller 70 is rotatably mounted to one of the pair of arms 40 and the other roller 70 is rotatably mounted to the other of the pair of arms 40. The rollers 70 facilitate the movement of the storage box 36 between the first and second positions. The rollers 70 are configured to engage the rail 60 and the rail 60 further provides guidance for the movement of the storage box 36. The rail 60 may include a stop 72, as shown in FIG. 2. The stop 72 is formed on the lower portion of the tray 52 and is operable to prevent the storage box 36 from moving past a predetermined location along the rail 60. For instance, the stop 72 may be disposed at the distal end of the rail 60 so as to prevent the storage box 36 from being disengaged from the tray 52.

Figure 4:
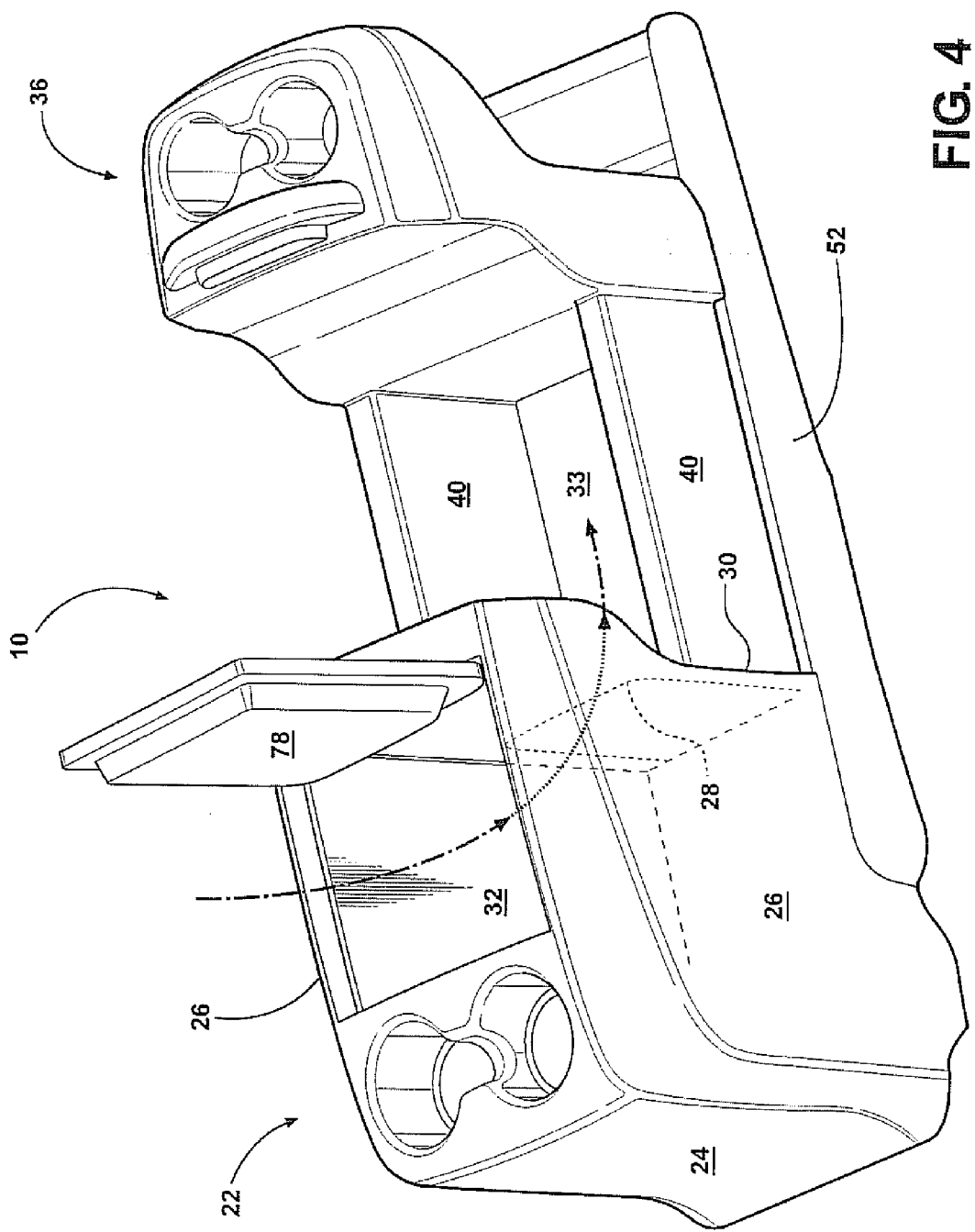
FIG. 4 is a view of FIG. 3 showing the lid in the open position.

With reference now to FIG. 4, the console assembly 10 may further include a top 74. The top 74 may be formed of the same material as the housing 22. The top 74 has a generally planar top surface 76. The top 74 is disposed between the pair of side walls 26 so as to enclose the first storage compartment 32. The top 74 may further include a lid 78. The lid 78 is operatively attached to the top 74 and is movable between an open and a closed position. In the closed position the lid 78 is substantially flush with the planar top surface 76 of the top 74. In the open position a portion of the lid 78 is displaced from the top 74 so as to provide access to the first storage compartment 32. The top 74 may further include console accessories 80 such as cup holders, bins, and open compartments adaptable for holding articles such as beverages, pens, coins, and the like.

With reference now to FIG. 1, the console assembly 10 is shown mounted on the floor 14 of the automotive vehicle 12 between the front passenger seat 16 and the driver's seat. The automotive vehicle 12 further includes rear passenger seats 20 spaced apart from the front and passenger and driver's seat. As is currently known, the front passenger seat 16 and the driver's seat are aligned generally along a first axis 82. The first axis 82 extends across the width of the vehicle 12. Likewise, the rear passenger seat 20 extends along a second axis 84 that is parallel and spaced apart from the first axis 82. The rear passenger seats 20 are generally disposed along the second axis 84. The console assembly 10 is shown with the storage box 36 in the second position.

Figure 3:
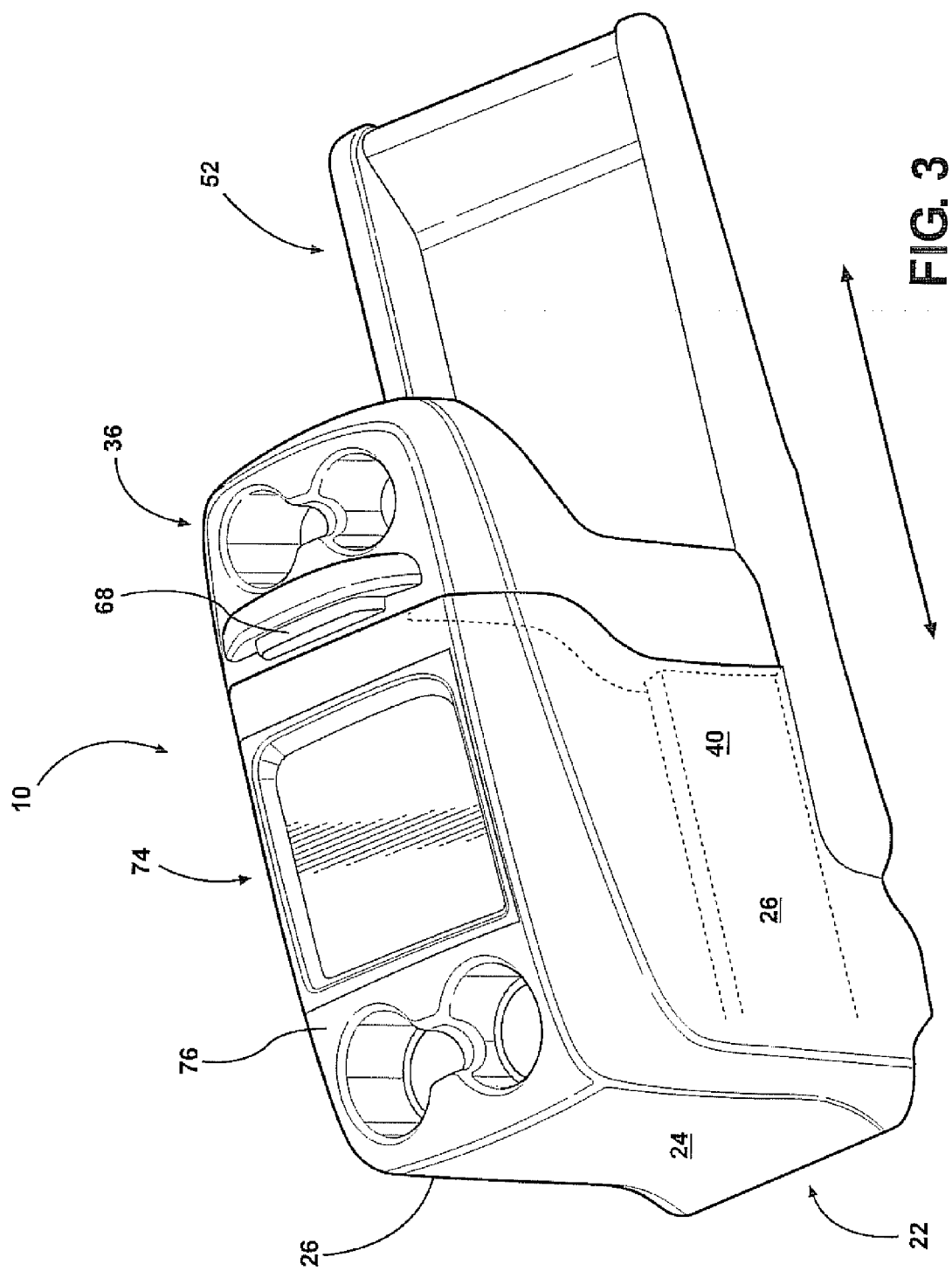
FIG. 3 is a perspective view of the side of the console assembly of FIG. 2.

With reference now to FIGS. 3 and 4, the operation of the console assembly 10 is illustrated. The handle 68 may be actuated so as to release the catch 64 from the rail slot 62 and the storage box 36 may be slid to any one of the free rail slots 62 so as to create a second storage compartment 33. As is shown, the second storage compartment 33 is easily accessible by passengers in the rear passenger seat 20 of the vehicle 12. When the passenger wishes to exit the vehicle 12, the storage box 36 may be slid into the first position so as to clear space along the second axis 84 and facilitate the rear passenger's exit of the vehicle 12.

Figure 6:
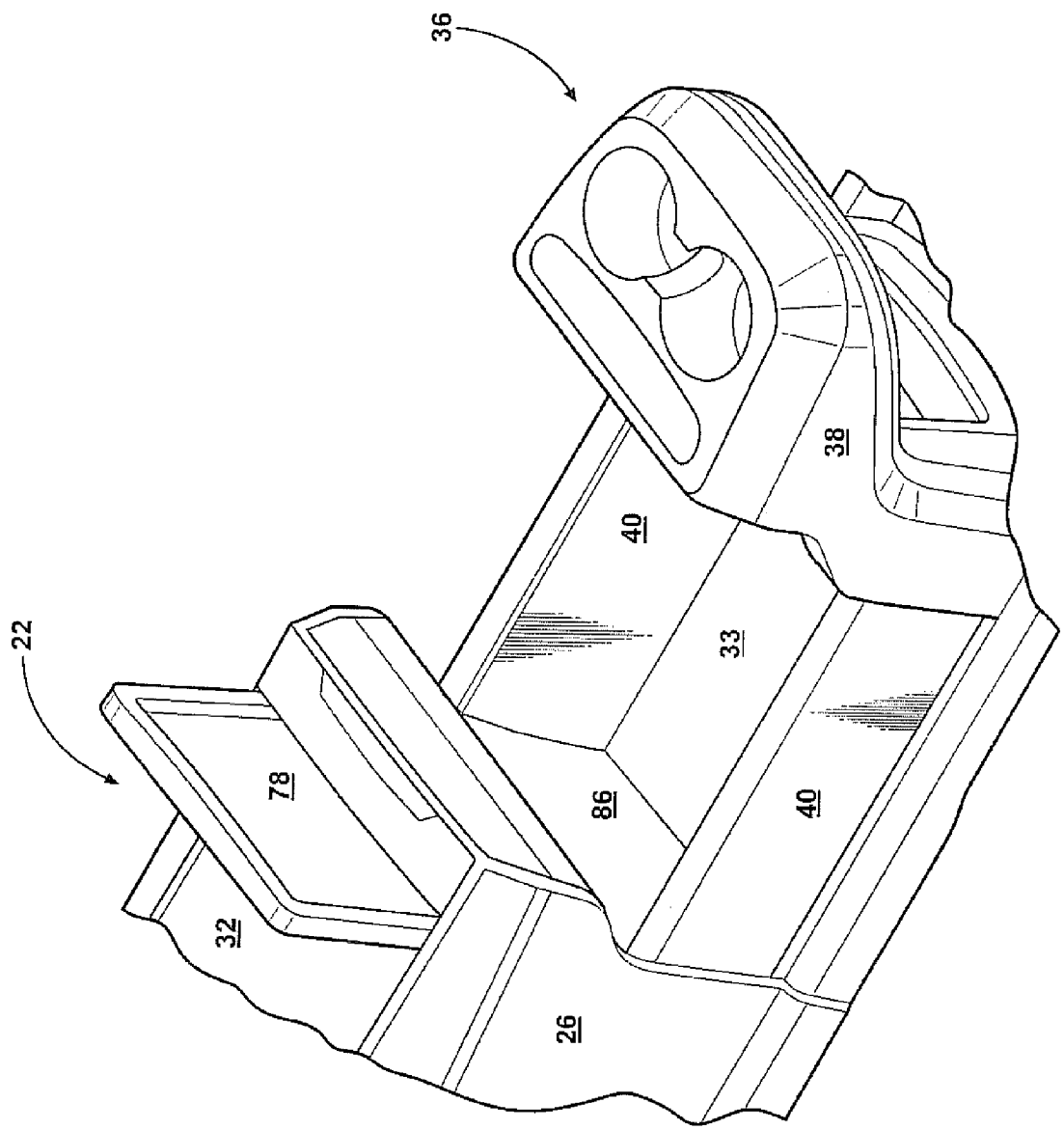
FIG. 6 is a perspective view of a second preferred embodiment of the console assembly.

With reference now to FIG. 6 a second preferred embodiment of the console assembly 10 is provided, wherein like parts are indicated by numerals offset by 100. In the second preferred embodiment, the console assembly 10 includes a partition 86. The partition 86 is a panel of like material disposed adjacent the free end 30 of respective pair of side walls 26. The partition 86 interconnects one of the pair of side walls 26 towards the other. The partition 86 extends generally from the top 74 down towards the floor 14 of the console assembly 10. Accordingly as the second end wall 38 of the storage box 36 is displaced from the first end wall 24 of the housing 22, a second storage compartment 33 is defined. The second storage compartment 33 is reconfigurable and may be expanded or retracted based upon the displacement of the storage box 36 with respect to the housing 22. Thus, the second storage compartment 33 is defined by the space between the partition 86 and the second end wall 38 as the second end wall 38 is moved to the second position.

Obviously, many modifications and variations of the present invention are possible in light of the above teachings and may be practiced otherwise than as specifically described while within the scope of the appended claims.

The invention claimed is:

1. A console assembly for use in an automotive vehicle, the console assembly operable to create a reconfigurable storage compartment, the console assembly comprising:
    a housing having a first end wall and a pair of side walls spaced apart from the other, each of the pair of side walls extending from the first end wall to a free end so as to define a first storage compartment, and each of the pair of side walls further including an outer wall spaced apart an inner wall so as to define a slot extending longitudinally from the free end of respective side walls; and
    a storage box slidably engaged with the housing between a first position and a second position, the storage box having a second end wall and a pair of arms spaced apart from each other, and each of the pair of arms is configured to engage respective slots of the housing, each of the pair of arms slidably disposed between respective inner and outer walls of each of the pair of side walls, and the storage box is movable between the first and second positions so as to form a second storage compartment.

2. The console assembly as set forth in claim 1, whereby each of the pair of side walls further includes an outer surface panel and an inner surface panel, and the slot is disposed between the inner and outer surface panels and is in communication with the free end.

3. The console assembly as set forth in claim 1, further including a partition disposed adjacent the free end of respective pair of side wall, the partition interconnecting one of the pair of side walls to the other.

4. The console assembly as set forth in claim 1, further including a tray configured to support the housing and the storage box.

5. The console assembly as set forth in claim 2, further including a plurality of ribs disposed between the outer surface panel and the inner surface panel so as to provide structural reinforcement to the housing.

6. The console assembly as set forth in claim 1, whereby the housing further includes a top disposed between the pair of side walls so as to enclose the first storage compartment.

7. The console assembly as set forth in claim 6, whereby the top further includes a lid operatively attached to the top so as to move between an open and closed position, and in the closed position the lid is substantially flushed with the outer surface of the top, and in the open position a portion of the lid is displaced from the top so as to provide access to the first storage compartment.

8. The console assembly as set forth in claim 4, further including a rail disposed along a portion of the tray, and the storage box includes a catch configured to engage the rail so as to selectively position the storage box along a selected portion of the rail.

9. The console assembly as set forth in claim 8, further including a biasing member operatively connected to the catch, the biasing member urging the catch to engage the rail.

10. The console assembly as set forth in claim 9, whereby the storage box includes a handle operatively connected to the catch, the handle operable to actuate the catch so as to overcome the force of the biasing member and disengage the catch from the rail.

11. The console assembly as set forth in claim 10, whereby the storage box further includes a pair of rollers, one roller is rotatably mounted on one of the pair of arms and the other roller is rotatably mounted to the other of other pair of arms.

12. The console assembly as set forth in claim 11, whereby the rail includes a stop, the stop operable to prevent the storage box from moving past a predetermined location along the rail.

13. The console assembly as set forth in claim 6, further including a first cup holder, the first cup holder disposed on the top.

14. The console assembly as set forth in claim 1, whereby each of the pair of side walls are angled towards the other.

* * * * *

UNITED STATES PATENT AND TRADEMARK OFFICE
CERTIFICATE OF CORRECTION

PATENT NO.         : 8,196,985 B2
APPLICATION NO.    : 12/628412
DATED              : June 12, 2012
INVENTOR(S)        : Benjamin Warren Penner et al.

Page 1 of 1

It is certified that error appears in the above-identified patent and that said Letters Patent is hereby corrected as shown below:

In the Specification:

At column 2, line number 9, before the second, Insert --of--.

In the Claims:

At column 6, claim number 11, line number 43, after to the other, Delete "of other".

Signed and Sealed this
Twenty-fourth Day of June, 2014

Michelle K. Lee
*Deputy Director of the United States Patent and Trademark Office*